J. A. Hadley,
Sheep Shears.
N° 42,579. Patented May 3, 1864.
Fig: 1.
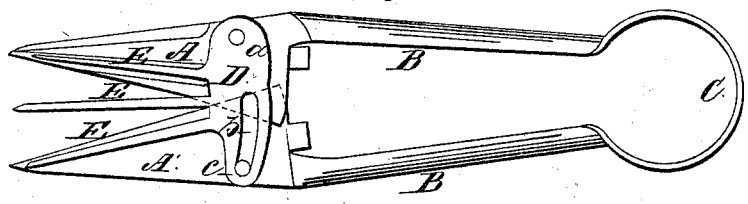
Fig: 2.
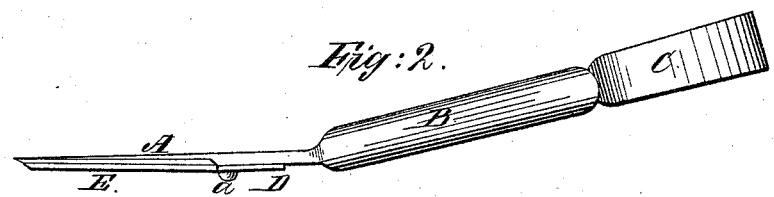
Fig: 3.
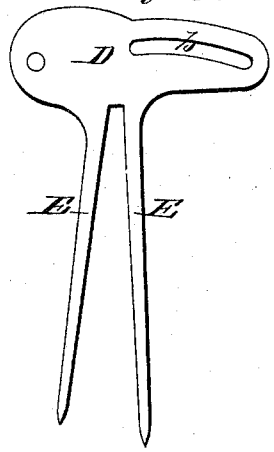
Fig: 4.
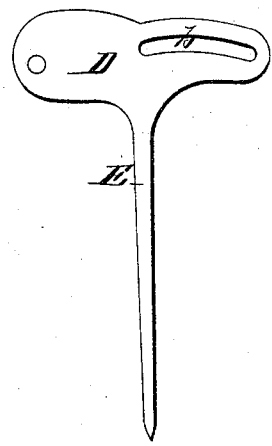
Witnesses:
J. W. Coombs
G. W. Reed
Inventor:
J. A. Hadley
per Munn & Co.
Attorneys

UNITED STATES PATENT OFFICE.

J. A. HADLEY, OF WEST WATERFORD, VERMONT.

IMPROVEMENT IN SHEEP-SHEARS.

Specification forming part of Letters Patent No. 42,579, dated May 3, 1864.

*To all whom it may concern:*

Be it known that I, J. A. HADLEY, of West Waterford, in the county of Caledonia and State of Vermont, have invented a new and useful Improvement in Shears for Shearing Sheep; and I do hereby declare that the following is a full, clear, and exact description of the same, reference being had to the accompanying drawings, making a part of this specification, in which—

Figure 1 is an under side view of my invention; Fig. 2, a side view of the same; Figs. 3 and 4, detached views of the guards pertaining to the same.

Similar letters of reference indicate corresponding parts in the several figures.

This invention consists in the employment or use of a guard attached to the shears in such a manner as to effectually prevent the latter from cutting the skin of the sheep during the process of shearing the same, and also to prevent the wool from distending or forcing apart the blades of the shears during the cutting operation, a contingency which frequently occurs, especially when the shears loose their keen edge in consequence of the wool slipping in parallelly between the two blades.

To enable those skilled in the art to fully understand and construct my invention, I will proceed to describe it.

A A' represents the two blades of a sheep-shears; B B, the handles thereof, which are connected by a semicircular spring, C. These parts may be constructed in the usual way, and therefore do not require a minute description.

D represents a metal plate, which is secured by a screw or pivot, $a$, to the under side of one of the blades A, the plate being allowed to work or turn freely on said screw or pivot $a$. This plate projects underneath the blade A', and it has a curved slot, $b$, made in it, through which a screw, $c$, passes into plate A', the head of said screw projecting over the edges of the slot $b$, but the screw being allowed to work freely in said slot under the cutting action of the blades. To this plate D there are attached one or more rods, E, which extend forward to, or nearly to, the tips of the blades A A'.

In Fig. 1 the plate D is shown provided with three rods, E, but one or two rods may be used, as shown in Figs. 3 and 4. The rod or rods E serve as guards and prevent the blades of the shears from cutting the skin of the animal as the shears are passed over the latter, and the plate D, in consequence of being connected to the two blades, as shown, prevents the wool from slipping or passing in between the two blades, as the plate holds the blades snugly together and keeps the cutting-edges of the same as they cross each other in the cutting operation in close contact. The plate D, it will be seen, will not interfere in the least with the perfect action of the shears, and as the blades A A' are pressed or forced toward each other the plate D is slightly turned on its pivot or screw $a$ in consequence of the manner in which it is connected with the blade A, and the central rod, E, kept in line with the cutting-point of the blades.

I am aware that a single rod, E, has been applied to sheep-shears to serve as a guard to prevent the sheep being cut; but said rod was not attached to or connected with the blades of the shears, but to the springs connected with the handle. This arrangement does not operate well. The wool frequently will pass in between the rod or guard and the blades and force the latter from the former, and the wool will frequently pass in obliquely between the blades themselves and force them apart, so as to prevent the cutting of the wool, a contingency which cannot occur in the use of my invention.

Having thus described my invention, what I claim as new, and desire to secure by Letters Patent, is—

The employment or use of one or more rods or guards, E, attached to a plate, D, which is secured by a pivot or screw, $a$, to one of the blades, A, of a sheep-shears, and is connected to the other blade, A', by means of the slot $b$ and screw $c$, all arranged substantially as and for the purpose herein set forth.

J. A. HADLEY.

Witnesses:
 JONATHAN ROSS,
 A. B. GOSS.